Figure 1:
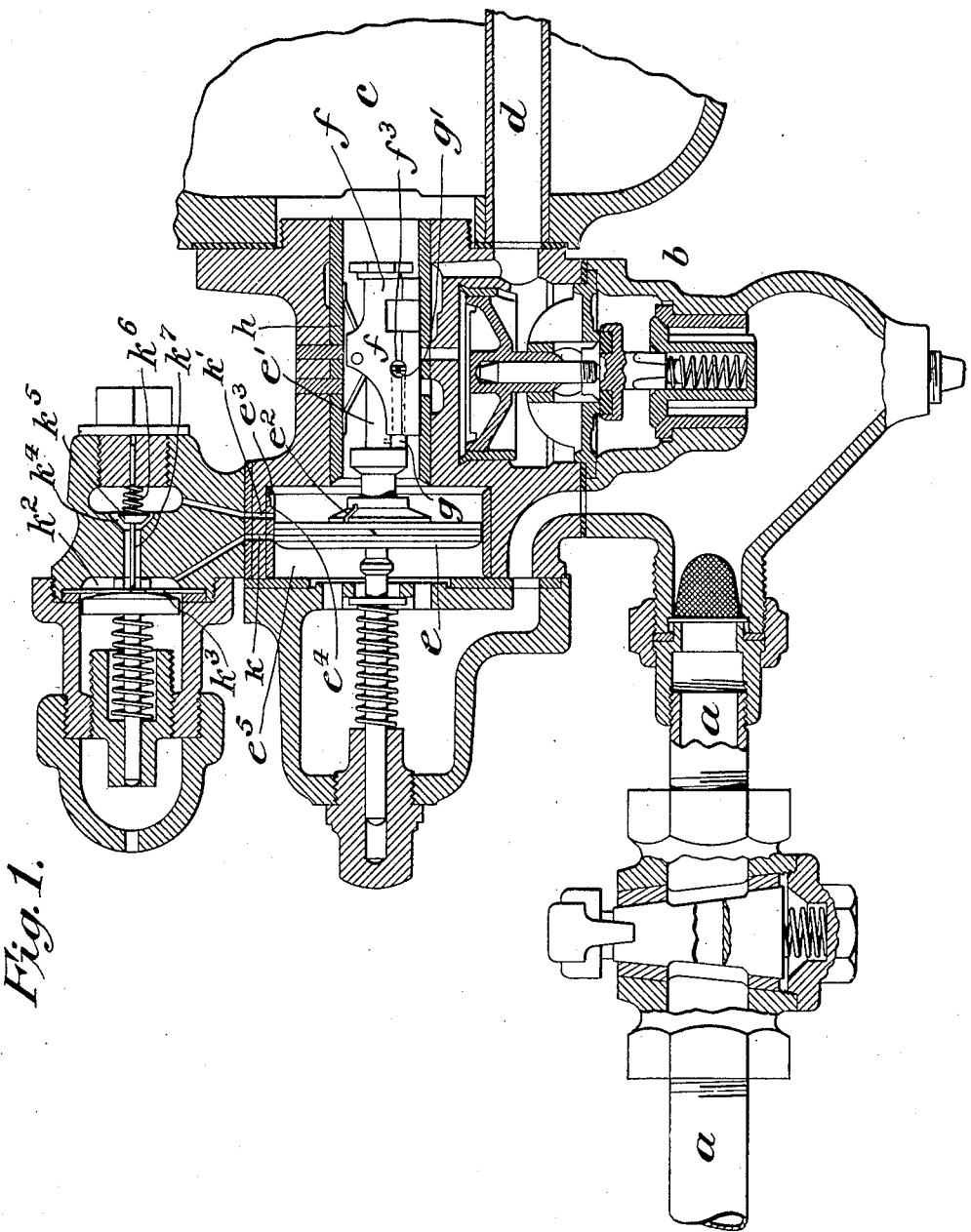

No. 875,958. PATENTED JAN. 7, 1908.
W. H. SAUVAGE.
VALVE FOR FLUID PRESSURE BRAKES.
APPLICATION FILED MAR. 5, 1907.

3 SHEETS—SHEET 1.

Attest:

Inventor:
William H. Sauvage
by Redding, Kiddle & Greeley
Attys.

No. 875,958. PATENTED JAN. 7, 1908.
W. H. SAUVAGE.
VALVE FOR FLUID PRESSURE BRAKES.
APPLICATION FILED MAR. 5, 1907.

3 SHEETS—SHEET 2.

Attest:

Inventor:
William H. Sauvage
by Redding, Kiddle & Greeley
Attys.

No. 875,958. PATENTED JAN. 7, 1908.
W. H. SAUVAGE.
VALVE FOR FLUID PRESSURE BRAKES.
APPLICATION FILED MAR. 5, 1907.

3 SHEETS—SHEET 3.

Attest:

Inventor:
William H. Sauvage
by Redding, Kiddle & Greeley
Attys

UNITED STATES PATENT OFFICE.

WILLIAM H. SAUVAGE, OF NEW YORK, N. Y.

VALVE FOR FLUID-PRESSURE BRAKES.

No. 875,958.  Specification of Letters Patent.  Patented Jan. 7, 1908.

Application filed March 5, 1907. Serial No. 360,752.

*To all whom it may concern:*

Be it known that I, WILLIAM H. SAUVAGE, a citizen of the United States, residing in the borough of Manhattan, of the city of New York, in the State of New York, have invented certain new and useful Improvements in Valves for Fluid-Pressure Brakes, of which the following is a specification, reference being had to the accompanying drawings, forming a part hereof.

This invention relates to the so-called triple valves which constitute essential parts of fluid pressure brake systems and by means of which the operations of the brake mechanism are controlled.

In automatic or fluid pressure brake systems equipped with such triple valves as they are ordinarily constructed, it has been necessary to discharge the air from the brake cylinders and thereby to release the brakes before it has been possible to recharge the auxiliary reservoirs from which the service pressure used in the application of the brakes is derived. An engineer is, therefore, frequently confronted, especially when descending a long steep grade with a heavy train, with the alternative of endeavoring to control the train with an insufficient pressure in the auxiliary reservoirs and therefore in the brake cylinders, or of releasing the brakes temporarily in order to permit the full service pressure to be restored in the auxiliary reservoirs. Disastrous results not infrequently follow whether one alternative or the other be adopted. Moreover, with the constructions heretofore generally employed, after the brake cylinders are placed in communication with the auxiliary reservoirs and the pressure is equalized therein, such equalized pressure falls rapidly through leakage from the cylinders and cannot be restored without releasing the brakes.

It has been sought heretofore to provide means whereby the service pressure in the auxiliary reservoirs can be maintained without releasing the brakes, if they have been applied, but the practical conditions of operation have generally rendered the devices provided for the purpose of little or no avail, particularly when long trains are being handled, because, since the recharging cannot be cut off, the excess pressure necessary to throw the triple valves into release position cannot be exerted near the rear of the train and the brakes, therefore, cannot be released.

It is, therefore, the object of this invention not only to provide effective means for automatically maintaining the pressure against reduction by leakage and for automatically recharging the auxiliary reservoirs to a predetermined pressure, but also to provide means for cutting off automatically the continued recharging, so that the necessary excess pressure can be exerted to throw the triple valve to release position.

A further object is to prevent the undesired release of the brakes through leakage at any point.

In accordance with the invention, provision is made whereby, when the triple valve piston is in lap position, the train line pressure is admitted to the auxiliary reservoir to recharge the same through a device which can be controlled by the engineer to cut off the further recharging at any time and permit the triple valve to be thrown into release position while at the same time, through another device, natural leakage from the brake cylinders is automatically compensated for and the unintentional release of the brake is thereby prevented. Moreover, as will be seen, the provisions for rapidly recharging the auxiliary reservoir under the control of the engineer renders the system practically a straight air brake system up to any predetermined pressure.

The invention will be more fully explained hereinafter with reference to the accompanying drawings in which, for purposes of explanation of the nature of the invention, it is represented as embodied in a convenient and reliable construction and in which—

Figure 2:
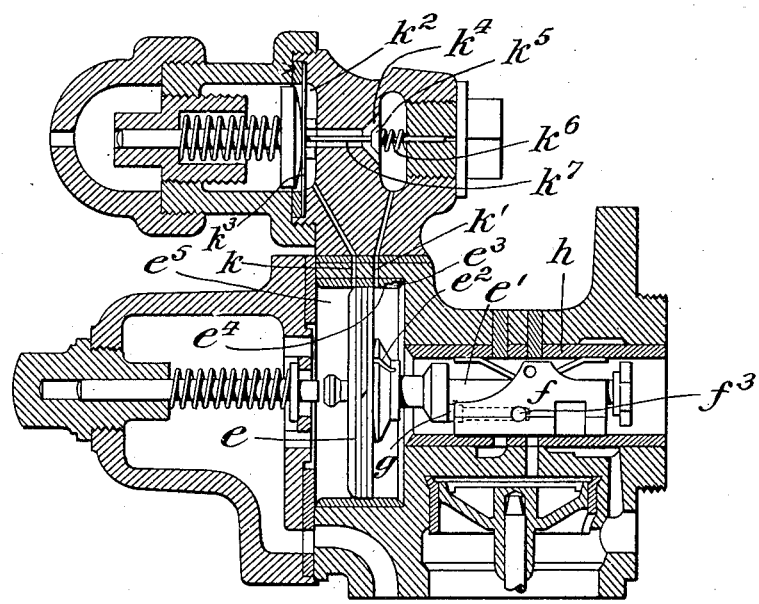
Figure 3:
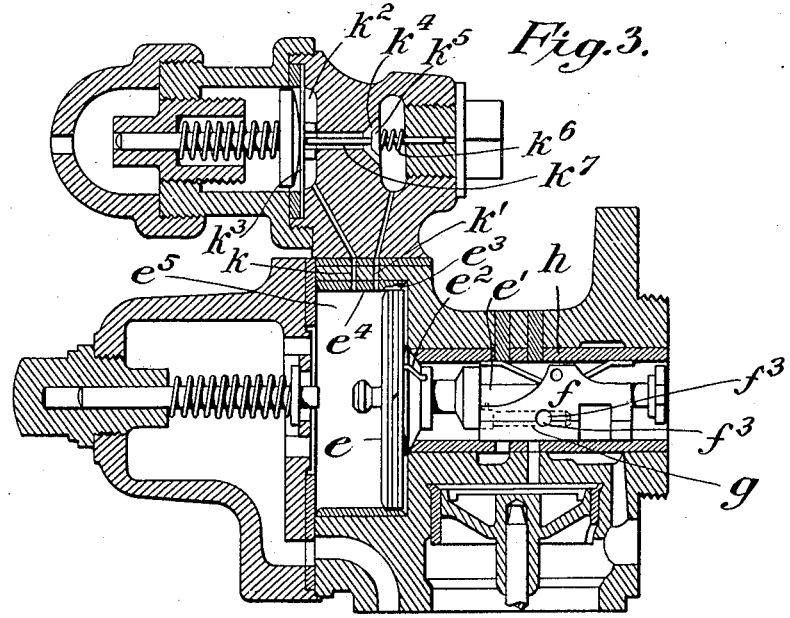
Figure 4:
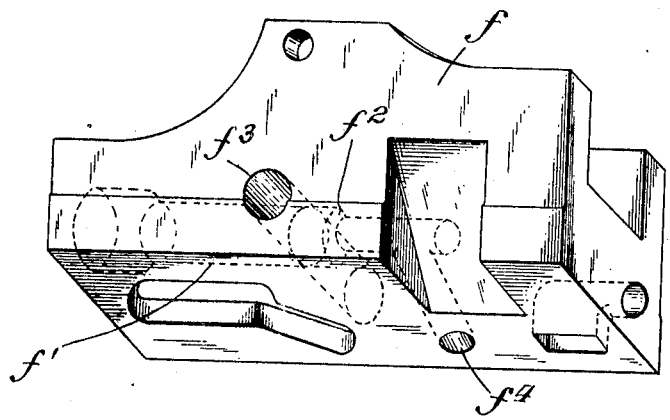
Figure 5:
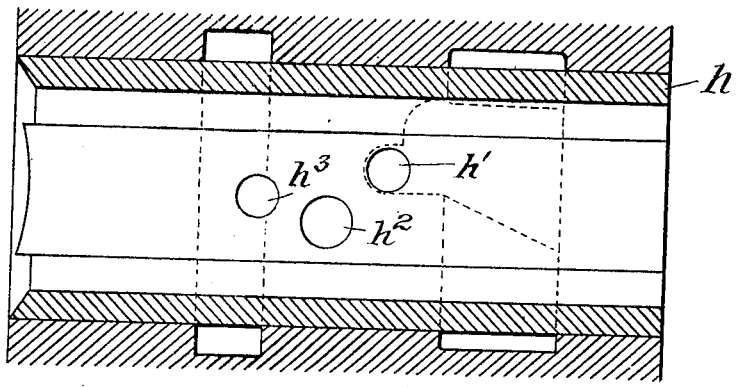
Figure 6:
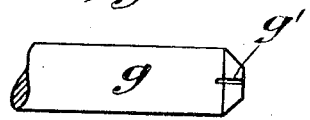
Figure 7:
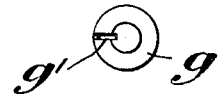

Figure 1 is a view principally in longitudinal central section of a triple valve of well known form to which the present improvements are applied, the triple valve piston and its connected parts being shown in service position. Fig. 2 is a view generally similar to Fig. 1, but showing the triple valve piston in lap position, some of the parts shown in Fig. 1 being removed. Fig. 3 is a view similar to Fig. 2 but with the triple valve piston in release position. Fig. 4 is a detail view in perspective, and on a larger scale, of the slide valve. Fig. 5 is a detail view of the slide way or seat of the slide block. Figs. 6 and 7 are detail views of the end of the graduating valve.

The structure shown in the drawings, except with respect to the novel features hereinafter pointed out, is of the ordinary character of triple valve construction and comprises a train pipe connection $a$, a triple valve casing $b$, an auxiliary reservoir $c$, a connection $d$ to the brake cylinder (the latter not being shown), a triple valve piston $e$ and stem $e'$, a slide valve $f$ and a graduating valve $g$. When the piston $e$ is in the release or extreme right hand position, as shown in Fig. 3, the auxiliary reservoir is charged, as usual, through the channel $e^2$ in the hub of the piston and the channel $e^3$ in the bushing $e^4$ of the chamber or cylinder $e^5$ in which the piston moves. The train pipe pressure is admitted directly, as usual, at one side of the piston $e$ and the space at the other side of the piston communicates directly with the auxiliary reservoir $c$ through the bushing $h$ in which the stem $e'$ and slide block $f$ reciprocate and in which the latter is seated. The bushing $h$ (see Fig. 5) is provided with a port $h'$ which communicates with the brake cylinder connection $d$, with a port $h^2$ which communicates with the emergency valve, and with a port $h^3$ which communicates with the atmosphere. The slide block $f$ (see Fig. 4) is provided with the usual ports and channels to coöperate with the ports $h'$, $h^2$ and $h^3$ in the ordinary manner and is also provided with a chamber $f'$ and seat $f^2$ for the stem of the graduating valve $g$. The graduating valve controls a passage of air from the auxiliary reservoir $c$ into the brake cylinder connection $d$ through a channel $f^3$ which opens in the sides of the slide block, and a channel $f^4$ which is adapted to communicate, when the piston $e$ is in lap position, with the port $h'$ which in turn communicates with the brake cylinder connection.

As thus far described all of the parts are constructed and operated substantially as usual. In accordance with the first part of the present invention there are formed through the bushing $e^4$ and the wall of the casing two ports $k$ and $k'$ which are so placed that when the piston $e$ is in lap position, as shown in Fig. 2, both ports are uncovered. Under certain conditions, determined either by the engineer or automatically, air is permitted to pass from one side of the piston $e$ through the port $k$ and to return on the other side of the piston through the port $k'$ for the purpose of admitting the train line pressure slowly, when the piston is in lap position, to the auxiliary reservoir and thereby restore and maintain in the auxiliary reservoir practically the full train line pressure. It is undesirable to permit such transmission of pressure to take place under any and all conditions without control and the port or channel $k$ therefore communicates with the diaphragm or piston chamber $k^2$ and thence, through a valve port $k^4$, controlled by a valve $k^5$, with the channel or passage $k'$. In the diaphragm or piston chamber is mounted a diaphragm or piston $k^3$ (preferably a diaphragm) which is subject on one side to the pressure either from the auxiliary reservoir or from the train line, as may be most convenient, and on the other side to any convenient counter balancing pressure, such, for example, as that of a spring actuated plunger, so that the diaphragm shall be sensitive and respond readily to variations of pressure from the train line or the auxiliary reservoir, as the case may be. The valve $k^5$ is pressed normally on its seat by a light spring $k^6$ and carries a stem $k^7$ which bears against the diaphragm $k^3$. It will now be seen that when the piston $e$ is in lap position and the pressure on the diaphragm $k^3$ is normal, the valve $k^5$ will be held from its seat and the train line pressure will be transmitted to the channel $k'$ and thence to the auxiliary reservoir, thereby permitting the gradual restoration of pressure in the auxiliary reservoir to the normal so that the pressure in the auxiliary reservoir is maintained practically equal to the train line pressure under all normal conditions, thus permitting the use of the full train line pressure for the service application of the brakes, if desired. Should the pressure on the two sides of the piston become unbalanced so that the pressure in the diaphragm chamber $k^2$ is increased above the normal, then the diaphragm will be pushed back against its counter balancing resistance and will permit the valve $k^5$ to seat itself, thus cutting off communication between the ports $k$ and $k'$ until such time as the pressures on the two sides of the piston are again equalized when the valve $k^5$ will open automatically and permit transmission of pressure to the auxiliary reservoir in the manner described. As the diaphragm is balanced or nearly balanced for the normal or predetermined pressure, a slight increase of pressure in the train line, by the engineer, will close the valve $k^5$, thus cutting off the transmission of pressure to the auxiliary reservoir and permitting the necessary excess of pressure to be exerted on the triple valve piston to throw it to release position. The engineer thus has complete control of all of the triple valves throughout the length of the train, when recharging the auxiliary reservoirs and holding the brakes on long descending grades, and the use of the ordinary retaining valves is rendered unnecessary.

The slide block and graduating valve $g$ coöperate in the usual manner except that there is formed, either in the seat $f^2$ of the graduating valve or preferably, as shown in Figs. 1, 6 and 7, in that portion of the graduating valve which coöperates with the seat, a channel $g'$, so that when the valve is on its seat and the transmission of working pressure to the brake cylinder is prevented, nevertheless, there will be, through the channel $g'$, a sufficient passage of air to compensate for the usual leakage in the brake cylinder, the channel being so proportioned, as shown in Figs. 6 and 7, as to permit the passage of air in proportion to the escape of air from the cylinder through leakage.

It will be understood that the relation of the diaphragm to the respective channels $k$ and $k'$ might be reversed, that any suitable counter balancing pressure might be applied to the diaphragm $k^2$, that the compensating channel $g'$ might be differently placed, and that various other changes in details of construction might be made without affecting the accomplishment of the desired objects, namely, the maintenance, under suitable conditions and proper control, of the pressure in the auxiliary reservoir and the compensation for the loss of pressure in the brake cylinder through leakage, and therefore without departing from the spirit of the invention.

I claim as my invention:

1. In a triple valve for fluid pressure brake systems, a piston chamber having two ports uncovered by the piston in lap position on opposite sides thereof, communication being normally established from one port to the other to permit the transmission of pressure from the train line to the auxiliary reservoir, and a valve normally open but closed by excess of pressure to prevent the transmission of pressure from one of said ports to the other.

2. In a triple valve for fluid pressure brake systems, a piston chamber having two ports uncovered by the piston in lap position on opposite sides thereof, communication being normally established from one port to the other to permit the transmission of pressure from the train line to the auxiliary reservoir, a valve normally open but closed by excess of pressure to prevent the transmission of pressure from one of said ports to the other, and a diaphragm subject to the pressure to control said valve.

3. In a triple valve for fluid pressure brake systems, the combination of a piston chamber having two ports uncovered by the piston in lap position on opposite sides thereof, and normally in free communication, a train line connection communicating with the piston chamber on one side of the piston, an auxiliary reservoir communicating with the piston chamber on the opposite side of the piston and means subject to excess of pressure in the piston chamber to prevent the transmission of pressure from one of said ports to the other.

4. In a triple valve for fluid pressure brake systems, the combination of an auxiliary reservoir, a brake cylinder connection, a slide valve and a graduating valve to control the communication between the auxiliary reservoir and the brake cylinder connection, a leakage channel being provided between the graduating valve and its seat for the transmission of pressure from the auxiliary reservoir to the brake cylinder connection.

This specification signed and witnessed this 23d day of Feby. A. D. 1907.

WILLIAM H. SAUVAGE.

Signed in the presence of—
AMBROSE L. O'SHEA,
ELLEN J. KRUGER.